May 8, 1923.

E. F. ULRICH 1,454,089

LOAD COUNTERBALANCING MECHANISM

Filed April 5, 1920     2 Sheets-Sheet 1

Inventor

EDWARD·F·ULRICH·

By George R. Frye

Attorney

May 8, 1923.

E. F. ULRICH 1,454,089

LOAD COUNTERBALANCING MECHANISM

Filed April 5, 1920

Inventor
·EDWARD·F·ULRICH·

By  George R. Frye

Attorney

Patented May 8, 1923.

1,454,089

UNITED STATES PATENT OFFICE.

EDWARD F. ULRICH, OF TOLEDO, OHIO, ASSIGNOR TO TOLEDO SCALE COMPANY, OF TOLEDO, OHIO, A CORPORATION OF NEW JERSEY.

LOAD-COUNTERBALANCING MECHANISM.

Application filed April 5, 1920. Serial No. 371,244.

*To all whom it may concern:*

Be it known that I, EDWARD F. ULRICH, a citizen of the United States, residing at Toledo, in the county of Lucas and State of Ohio, have invented certain new and useful Improvements in Load-Counterbalancing Mechanism, of which the following is a specification.

This invention relates to weighing scales and particularly to automatic load-offsetting or counterbalancing devices, and one of its principal objects is to provide an angularly movable device of this kind so arranged as to swing through equal arcs in offsetting equal increments of load.

Another object is the provision of a load-offsetting device of the pendulum type in which the effective length of the pendulum increases as it swings upwardly to counterbalance a load.

Another object is the provision of a load-counterbalancing device of the pendulum type in which the pendulum weight moves outwardly along the pendulum stem as it swings to counterbalance the load.

Other objects and advantages will be apparent from the following description, in which reference is had to the accompanying drawings illustrating a preferred embodiment of my invention and wherein similar reference numerals designate similar parts throughout the several views.

In the drawings:—

Figure 1:
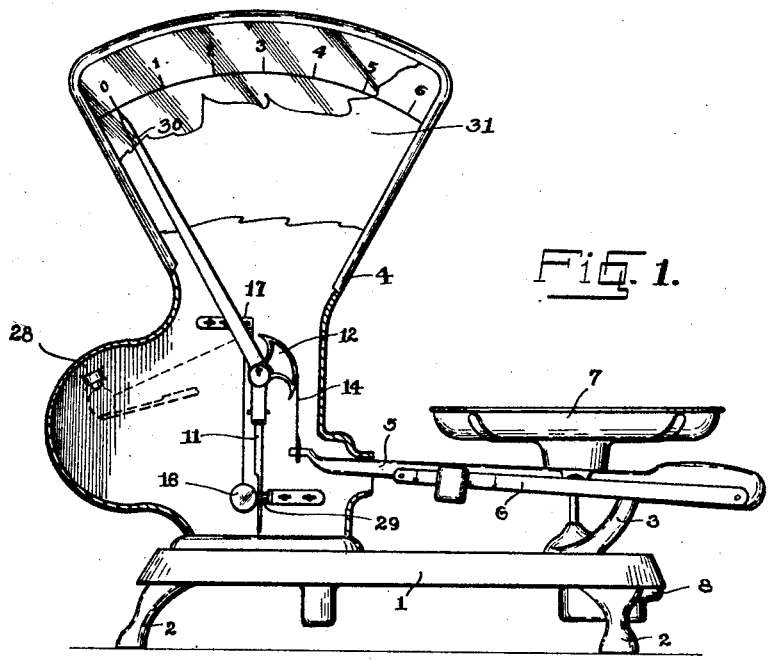
Figure 1 is an elevational view of a scale incorporating my invention.
Figure 2:
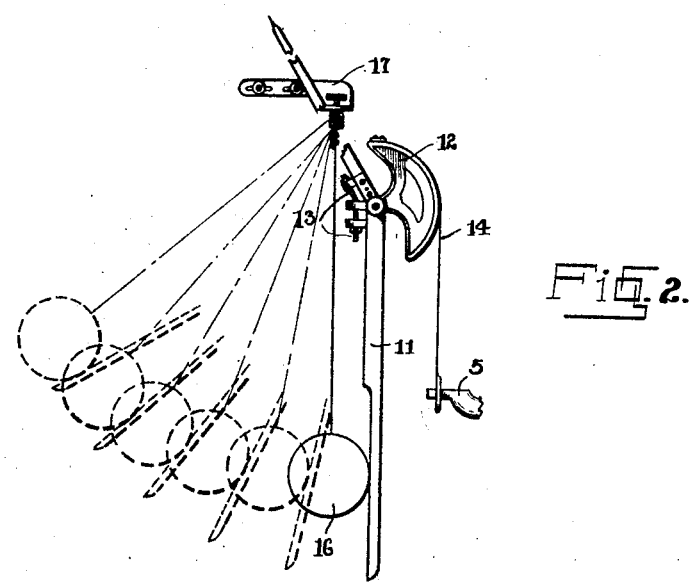
Figure 2 is an enlarged elevational view showing the load-counterbalancing device removed from the scale.
Figure 3:
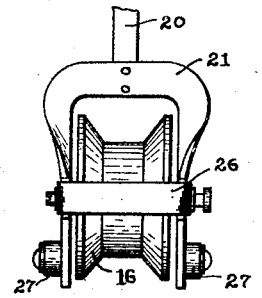
Figure 3 is an enlarged fragmentary elevational view of a rolling pendulum weight forming a part of my invention.
Figure 4:
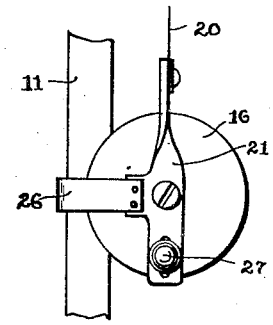
Figure 4 is an elevational view taken at right angles to Figure 3.
Figure 5:
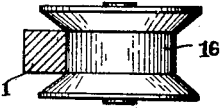
Figure 5 is a detail plan view of the rolling weight, with the stem on which it acts shown in section.
Figure 7:
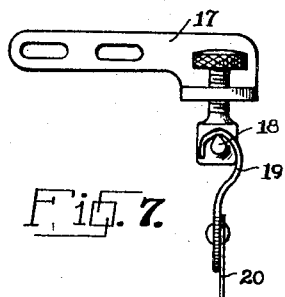
Figure 7 is a detail of an adjustable weight-supporting bracket.

I have shown my invention as applied to a scale having an indicator of the fan type, but it is to be understood that it is also capable of embodiment in scales having indicators of other types, such, for example, as cylinder and dial types, and that I contemplate its use wherever applicable.

In the embodiment shown, the frame of the scale comprises a base 1 supported upon legs 2 and having a base horn 3 projecting from its upper face adjacent one end and a substantially fan-shaped housing 4 supported from its upper face adjacent its other end. The base horn 3 constitutes a fulcrum stand for the main lever 5 of the scale, which may be of any desired form and may, if desired, carry a tare beam 6. The commodity-receiver 7 is supported upon the lever by means of load pivots (not shown) and is provided with a stem which extends downwardly into a housing 8 beneath the base 1 where it is connected to a suitable check link (not shown).

Figure 6:
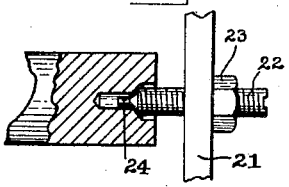
Figure 6 is a further enlarged detail showing the pins supporting the rolling weight.
Figure 8:
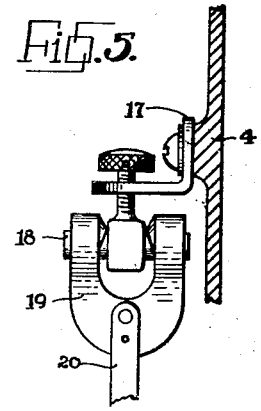
Figure 8 is a view taken at right angles to Figure 7 and showing a portion of the scale frame in section.
Figure 9:
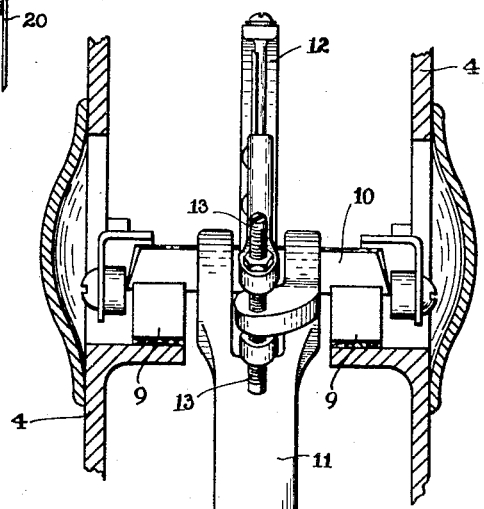
Figure 9 is a section through the frame of the scale, showing the pendulum center and pivots in elevation.

Supported within the fan-shaped housing 4 in the manner indicated in Figure 9 is a pair of grooved bearings 9, preferably of agate, upon which rests a knife-edge pivot 10. Depending from the pivot 10 is a stem 11 to which is connected a power sector 12 which may, if desired, be angularly adjustable, set screws 13 being provided to hold the sector in proper position. A flexible metallic band or ribbon 14 is secured to and overlies the curved face of the sector 12 and is connected at its lower end to the nose of the lever 5. In lieu of the usual bob or pendulum weight I have provided a roller 16 which engages the side of the pendulum stem 11 to resist its upward movement. This roller is supported from a bracket 17 adjustably secured inside the scale housing and carrying an adjustably mounted knife-edge pivot 18 which is engaged by a bearing hook 19. Secured to the hook 19 and depending therefrom is a steel ribbon 20, at the lower end of which is carried a substantially U-shaped frame 21. Bearing screws 22 are threaded through the arms of the U-shaped member and are held in proper adjustment by means of lock nuts 23. The end of each bearing screw is substantially conical in shape and is provided with a small tip 24, and the roller 26 is provided at each side with holes of the shape shown in Figure 6 so that the roller may turn with the minimum friction.

A guard loop 26 is secured to the frame 21 and passes over the stem 11 to prevent the roller from being thrown out of place by a sudden shock or abrupt movement of the stem 11. The frame 21 may, if desired, also be provided at its lower end with adjustable weights 27 to counterbalance the upper end of the frame. Bumpers 28 and 29 are secured to the scale housing in position to properly limit the weighing movements of the scale.

When a load is placed upon the scale the nose of the lever 5 is depressed and the ribbon 14 is pulled downwardly, causing the sector 12 and the stem 11 to swing about the pivot 10. Since the pivot 18 which supports the weight 16 is located above and at one side of the pivot 10, the weight 16 will roll outwardly along the stem 11 as the stem swings upwardly. The effective force exerted by the weight 16 to counterbalance the load on the commodity-receiver of the scale is proportional to the horizontal distance from the center of mass of the weight 16 to a point directly below the knife edge of the pivot 10, and equal increments of load will move the stem 11 sufficiently to increase this distance by equal increments. The relative positions of the pivots 10 and 18 are such that in moving the weight 16 through equal horizontal distances the stem 11 moves through equal angles about the pivot 10. For this reason an indicator such as is shown at 30, fixed directly to the pendulum, will swing through equal arcs in indicating equal increments of load. I am therefore enabled to use a chart 31 upon which the pound and ounce graduations are equally spaced. It is obvious that an indicator of any type connected to the stem 11 or the lever 5 by directly acting mechanism, such as a system of levers or a rack and pinion, will move through equal arcs in indicating equal increments of weight. It is also obvious that my invention may be employed in scales having oppositely-acting pendulum stems, whether they be supported by knife-edge pivots, flexible ribbons, or other means.

While it will be apparent that the illustrated embodiment of my invention herein disclosed is well calculated to adequately fulfil the objects primarily stated, it is to be understood that the invention is susceptible to modification, variation and change within the spirit and scope of the subjoined claims.

Having described my invention, I claim:

1. In a device of the class described, in combination, a pivoted member having a depending stem, a weight acting upon said stem to resist movement of said member from a predetermined position, and means for so positioning said weight longitudinally of said stem as to lengthen the lever arm upon which said weight acts to a degree substantially proportional to the degree of angular movement of said pivoted member.

2. In a device of the class described, in combination, a pivoted member having a depending stem, a weight engaging said stem to resist angular movement thereof, and means for so suspending said weight as to permit it to move outwardly along said stem as said pivoted member moves angularly, substantially as described.

3. In a device of the class described, in combination, a pivoted member, and a roller and means whereby said roller is suspended from a point horizontally offset from the pivotal axis of said pivoted member, and lying in contact with said pivoted member.

4. In a device of the class described, in combination, a pivoted member, and a roller and means whereby said roller is suspended from a point horizontally offset from the pivotal axis of said pivoted member and lying in contact with said pivoted member.

5. In a device of the class described, in combination, a pivoted member having a stem portion, and a roller and means whereby said roller is suspended from a point horizontally offset from the pivotal axis of said pivoted member and engaging said stem portion to resist angular movement of said pivoted member.

6. In a device of the class described, in combination, a pivoted member, a weight and means by which said weight is suspended from a point offset with respect to the pivotal axis of said pivoted member, and means for adjusting the point of suspension of said weight.

7. In a device of the class described, in combination, a pivoted member comprising a power sector concentric to its pivotal axis, and a weight and means by which said weight is suspended from a point offset from the pivotal axis of said pivotal member and engaging said pivoted member to resist displacement thereof.

8. In a device of the class described, in combination, a pivoted member comprising a power sector concentric to its pivotal axis and a stem portion, and a weight and means by which said weight is suspended from a point offset from the pivotal axis of said pivoted member and engaging said pivoted member to resist displacement thereof.

9. In a device of the class described, in combination, a pivoted member including a power sector, a commodity-receiver connected to said pivoted member, a weight, a flexible member suspending said weight from a point offset from the pivotal axis of said pivoted member, and means on said pivoted member engaging said weight whereby said weight resists angular movement of said pivoted member.

10. In a device of the class described, in combination, a pivoted member, including a power sector, flexible member connected to and overlying said power sector, a commodity-receiver connected to said flexible member, a weight, a flexible member suspending said weight from a point offset from the pivotal axis of said pivoted member, and means on said pivoted member engaging said weight whereby said weight resists angular movement of said pivoted member.

EDWARD F. ULRICH.

Witnesses:
C. E. WILCOX,
C. O. MARSHALL.